E. KENER, Jr.
SCREW NUT.
APPLICATION FILED JULY 19, 1909.
990,563.
Patented Apr. 25, 1911.
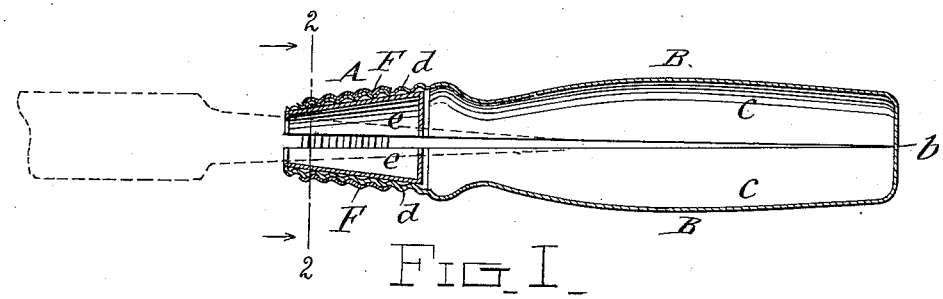
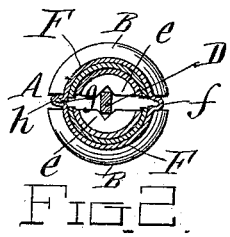
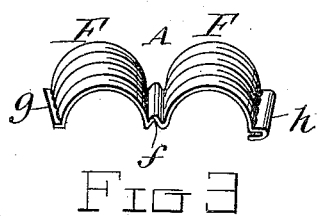
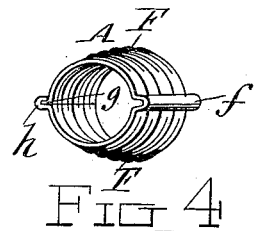
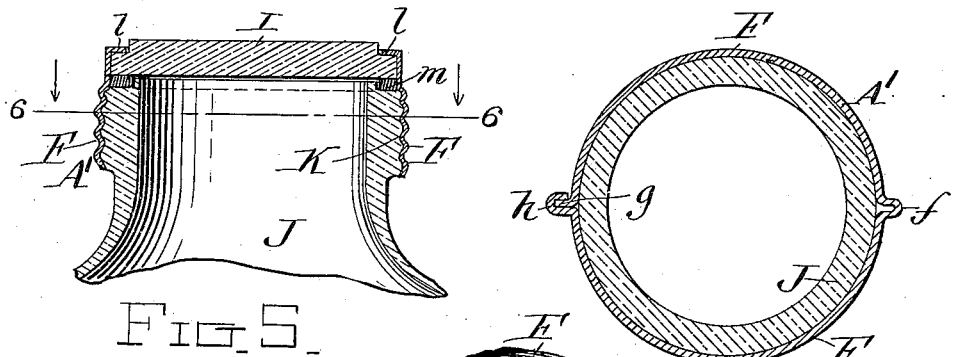
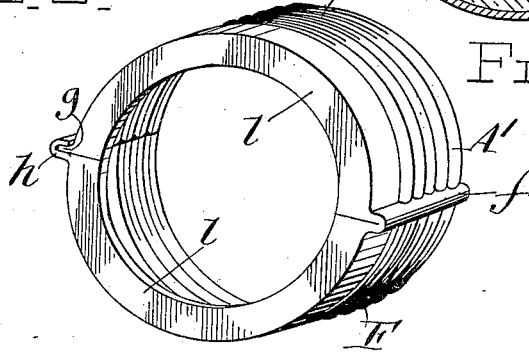

UNITED STATES PATENT OFFICE.

EDWARD KENER, JR., OF BUFFALO, NEW YORK.

SCREW-NUT.

990,563. Specification of Letters Patent. Patented Apr. 25, 1911.

Application filed July 19, 1909. Serial No. 508,349.

*To all whom it may concern:*

Be it known that I, EDWARD KENER, Jr., a citizen of the United States, residing at Buffalo, in the county of Erie and State of New York, have invented a new and useful Improvement in Screw-Nuts, of which the following is a specification.

This invention relates to a screw nut which is constructed of sheet metal and has the object to produce a strong, light and efficient nut of this character at comparatively low cost.

In the accompanying drawings: Figure 1 is a longitudinal section showing a detachable tool handle provided with my improved screw nut. Fig. 2 is a cross section thereof in line 2—2, Fig. 1. Fig. 3 is a perspective view of the partially formed screw nut for detachable tool handles embodying my invention. Fig. 4 is a perspective view of the complete screw nut for detachable tool handles. Fig. 5 is a vertical section showing a screw nut embodying my invention used for connecting the body and cover of a preserving jar. Fig. 6 is a horizontal section in line 6—6, Fig. 5. Fig. 7 is a perspective view of a complete screw nut for use in clamping a cover on the body of a preserving jar.

Similar letters of reference indicate corresponding parts throughout the several views.

The screw nut A shown in Figs. 1—4 is intended primarily for use in connection with a tool handle which is adapted to be detachably connected with different tools. The body of this handle may be variously constructed but as shown in Figs. 1 and 2 the same comprises two hollow arms or sections B, B which are connected at their rear ends by a web $b$ and constructed of a single sheet of metal. The rear parts of the sections or arms are constructed to form like halves of a hand piece or grip $c$ while the front ends thereof are constructed to form a forwardly-tapering sectional screw thread $d$. Within the front ends of the handle sections or arms the same are provided with opposing jaws $e$ which are adapted to engage with opposite sides of the tang D of the tool which is to receive the handle, said jaws being clamped against said tang by means of the tapering clamping screw nut A which is constructed in accordance with my invention. This clamping screw nut is preferably formed of a single piece of sheet metal which is first stamped from a blank so as to form two semi-circular threaded sections F, F arranged side by side, a longitudinal bead $f$ connecting the adjacent inner longitudinal edges of the nut sections and dished in the same direction as said sections, a longitudinal flange $g$ arranged on the outer longitudinal edge of one of the nut sections, and a longitudinal channel $h$ arranged on the outer longitudinal edge of the other nut section, as shown in Fig. 3. The nut sections are then bent toward each other with their concave sides facing each other and on the connecting bead as a turning point and then the channel on one section is interlocked or seamed over the flange on the other section so as to securely unite the nut sections on the side diametrically opposite the bead thereof, as shown in Fig. 4. This bead and seam forms shoulders or projections on opposite sides of the nut which permit a firm grip of the hand to be obtained on the screw nut and thus enable the nut to be readily tightened or loosened on the handle body sections when applying the handle to or removing the same from a tool.

For the purpose of applying the handle to a tool, the clamping nut is loosened to permit the front ends of the handle arms to separate and receive the tang of the tool between them, and upon tightening the nut the jaws of the arms are pressed tightly against opposite sides of the tang, thereby reliably connecting the handle and tool.

When constructing a screw nut embodying my invention for use in clamping the cover I on the body J of a fruit or preserving jar or glass, as shown in Figs. 5—7, the threaded body $A^1$ of the screw nut is made of substantially cylindrical form and engages internally with the external thread K on the neck of the jar and the upper or outer ends of the screw body sections are provided with inwardly projecting semi-circular flange sections $l$ which together form a complete internal annular shoulder which bears against the upper side of the marginal part of the cover and presses the same against the mouth of the jar, as shown in Fig. 5. A gasket or packing ring $m$ is interposed between the cover and body of the fruit jar in the usual manner. In all other respects the screw for clamping fruit jar covers is constructed like the screw nut for tightening the sections of the detachable tool handle.

Inasmuch as no solder is used in the construction of this screw nut and the same is produced solely by bending the sheet metal, manufacture of the same can be effected expeditiously and at low cost and maximum durability is insured.

By stamping this nut of sheet metal the same is much lighter than a cast or forged nut and also cheaper than a nut spun from sheet metal.

I claim as my invention:

1. A screw nut constructed of sheet metal and having two integral semi-circular threaded sections which have their concave sides facing each other and which are connected on one of their corresponding longitudinal edges by an off-set portion while their opposite longitudinal edges are connected by a joint.

2. A screw nut constructed of sheet metal to form two semi-circular sections arranged with their concave sides facing each other and connected on one side by a bead while their opposite sides are interlocked.

3. A screw nut constructed of sheet metal to form two semi-circular sections arranged with their concave sides facing each other and connected on one side by a bead while their opposite sides are connected by a flange arranged on the edge of one section, and a channel arranged on the corresponding edge of the other section and embracing said flange.

Witness my hand this 16th day of July, 1909.

EDWARD KENER, Jr.

Witnesses:
 THEO. L. POPP,
 ANNA HEIGIS.

Copies of this patent may be obtained for five cents each, by addressing the "Commissioner of Patents, Washington, D. C."